United States Patent [19]

Sandman

[11] Patent Number: 4,689,275

[45] Date of Patent: Aug. 25, 1987

[54] NON-SKID LAMINATED SHEET

[75] Inventor: Robert B. Sandman, Sheboygan, Wis.

[73] Assignee: The Vollrath Company, Sheboygan, Wis.

[21] Appl. No.: 773,332

[22] Filed: Sep. 6, 1985

[51] Int. Cl.⁴ .................. B32B 21/04; B32B 21/06
[52] U.S. Cl. .................. 428/537.1; 428/525; 428/425.3; 428/162; 428/156
[58] Field of Search .................. 428/537.1, 530, 525, 428/425.1, 425.3, 524, 503, 162, 156

[56] References Cited

U.S. PATENT DOCUMENTS

| | | |
|---|---|---|
| 2,646,380 | 7/1953 | Barlow . |
| 3,698,978 | 10/1972 | McQuade . |
| 3,846,217 | 11/1974 | Grosheim . |
| 4,092,196 | 5/1978 | Scher et al. . |
| 4,093,766 | 6/1978 | Scher et al. . |
| 4,163,818 | 8/1979 | Wernli . |
| 4,320,898 | 3/1982 | Brunst et al. ................ 428/537.1 X |
| 4,343,850 | 8/1982 | Kravig et al. . |
| 4,404,252 | 9/1983 | Hetzler et al. ............... 428/537.1 X |
| 4,412,883 | 11/1983 | Rico . |
| 4,515,852 | 5/1985 | Katabe et al. . |

FOREIGN PATENT DOCUMENTS

| | | | |
|---|---|---|---|
| 1534857 | 6/1969 | Fed. Rep. of Germany ... | 428/537.1 |
| 1019465 | 10/1952 | France .......................... | 428/537.1 |
| 49-29624 | 8/1974 | Japan ............................ | 428/537.1 |
| 0197608 | 3/1976 | Japan ............................ | 428/537.1 |
| 0087364 | 5/1982 | Japan ............................ | 428/537.1 |

*Primary Examiner*—Nancy A. Swisher
*Attorney, Agent, or Firm*—Dressler, Goldsmith, Shore, Sutker & Milnamow, Ltd.

[57] ABSTRACT

The present invention contemplates a decorated laminate comprising a unitary, heat and pressure cured layered structure having non-skid surface comprising a thermoplastic urethane elastomer layer.

3 Claims, No Drawings

NON-SKID LAMINATED SHEET

DESCRIPTION

1. Technical Field

The present invention relates to a laminated sheet having a non-skid surface.

2. Background

Laminated sheets prepared by fusing a plurality of thermoset resin-impregnated webs in a mold under conditions of elevated temperature and pressure are well-known in the art. For example, thermosetting resin-impregnated laminates are described in U.S. Pat. Nos. 2,646,380, 3,698,978, 4,093,766 and 4,343,850, which are incorporated herein by reference. Such laminates are useful as countertops, cabinet surfaces and serving trays.

Non-skid surfaces on laminates such as serving trays are frequently manufactured by affixing a cork layer, a synthetic rubber sheet or the like to the upper surface of the laminate using a layer of an adhesive material. Such trays are frequently used commercially and can be subjected to repeated high temperature washings. Repeated washing can affect the adhesive layer and thereby interfere with the attachment of the non-skid layer to the tray.

In other applications such as countertops, when a conventional laminated sheet having an adhesive-bonded, non-skid surface is cut, the layers are more likely to separate or produce an uneven edge than if a unitary laminate were used.

Unitary laminates in which the non-skid surface becomes an integral part of the laminate during the manufacturing process are therefore advantageous.

U.S. Pat. No. 4,163,818 to Wernli discloses a unitary anti-slip tray and method of manufacturing thereof. The tray is comprised of alternating layers of sheets of melamine-impregnated papers and phenol-impregnated papers covered by a perforated, loosely woven cloth and a layer of porous polyvinyl chloride (PVC).

SUMMARY OF THE INVENTION

The present invention contemplates a decorated laminate comprising a unitary, heat and pressured cured layered structure having a bonded non-skid surface. The non-skid surface comprises a thermoplastic urethane elastomer film.

Before cure, the laminate comprises in stacked relation a core impregnated throughout with a thermosetting resin, a decorative sheet impregnated throughout with a thermosetting resin that is adjacent to and in contact with the core, and a sheet of a thermoplastic urethane elastomer film having a thickness of about 0.001 to about 0.010 inches that is adjacent to the decorative sheet opposite to the core, and covers at least a portion of the decorative sheet.

The laminate can be adapted to suit various needs. For example, a second decorative sheet can be placed on the opposite side of the core from the urethane sheet to produce a laminate for use as a tray. Only one side of the laminate need be decorated for use as a countertop or the like. The non-skid surface can be either embossed or smooth depending on whether the laminate is primarily to be used under wet or dry conditions, respectively.

DETAILED DESCRIPTION

The present invention contemplates a decorated laminate comprising a unitary heat and pressured cured layered structure having a non-skid surface. Before cure the laminate comprises a stack that includes a core impregnated throughout with a thermosetting resin, a decorative sheet that is adjacent to the core impregnated throughout with a thermosetting resin, and a sheet of a urethane elastomer film that is adjacent to the decorative sheet on the opposite side of the decorative sheet from the core.

The urethane film has a thickness of about 0.001 to about 0.010 inches. The decorative sheet and the core can be impregnated with a thermosetting phenolic or melamine resin. The laminate can additionally include a second decorative sheet impregnated with a thermosetting resin that is adjacent to the core and on the opposite side of the core from the urethane sheet.

A core imparts rigidity or support to the laminate. In preferred practice, the core is comprised of a plurality of paper sheets. Those sheets preferably are of kraft paper, uncreped or creped, or in mixtures, although cotton linters paper, and cotton or linen cloth can also be used.

The sheets making up the core generally range in individual thickness from about 0.001 to about 0.025 inches, and preferably from about 0.002 to about 0.015 inches. The preferred kraft paper core sheets have a basis weight of about 30 to about 150 pounds; i.e., contain about 30 to about 150 pounds of paper per 3000 square feet. A plurality of core sheets is used in the laminates of this invention, and generally about 5 to about 30 such core sheets are used.

Laminates can also be formed from fewer than 5 core sheets. In these embodiments, rigidity can be imparted by including in the fused laminated structure a rigid preformed member such as a wood or metal sheet or ring, or a second laminate made similarly to those described herein. Additionally, the cured laminates of this invention can be affixed to a rigid member, as by gluing, after the laminate is cured. While a plurality of core sheets is used in these embodiments, as few as about 2 core sheets up to about 30 core sheets can be used.

In yet another embodiment, the core can be a preformed unit made of wood chips or pulp, recycled newsprint, fiberglass, cotton linters or the like which adhere together sufficiently to hold a shape. When such a preform is used, it is also impregnated throughout with a thermosetting resin as is discussed hereinafter.

A decorative sheet is also used in the laminates of this invention. This paper can have a basis weight of about 20 to about 100 pounds or weigh about 20 to about 100 pounds per 3000 sq. ft. In preferred practice, this paper has a basis weight of about 50 to about 90 pounds and is usually made from alpha-cellulose.

The decorative sheet is usually printed by a technique such as offset lithography or a silk screen process in hundreds to thousands of copies per printing run. These sheets can be printed in a solid color or in a desired pattern, such as wood grain, as is known in the art. A single layer of printed, decorative sheet is normally used at each place in the laminate at which a decorative sheet is called for, and after curing, the printed, decorative sheets are substantially opaque.

The core and decorative sheets are impregnated throughout with a thermosetting resin. The resins used herein are those commonly used in the industry for decorated laminates. These resins include melamine-formaldehyde resin, and substituted melamine-formaldehyde resins such as bezoguanamine formaldehyde resin, phenol-formaldehyde and substituted phenol resins such as cresol-formaldehyde resins, urea-formaldehyde and substituted urea-formaldehyde resins as well as phenolic rubbers, epoxy, silicone and acrylic resins. The melamine- and substituted melamine-formaldehyde resins are termed herein melamine resins, the phenol- and substituted phenol-formaldehyde resins are termed herein phenolic resins. While above resin types can each be used for each of the core and decorative sheets, it is preferred that phenolic resins be used for the core sheets. In a most preferred embodiment, the decorative sheets are impregnated with a phenolic resin. However, a melamine resin is preferred in some applications as where a light colored product is desired. These preferences are based upon cosmetic, cost and durability factors.

When a melamine-impregnated decorative sheet is used, a clear overlay sheet can additionally be used to improve the stain resistance of the melamine-impregnated surface. An overlay sheet is preferably omitted when the decorative sheet is covered by a urethane elastomer film.

The core (whether sheets or preform) and decorative sheets normally contain about 30–35 percent of their final "dry" weight of the phenolic resin which normally has about a 6–7 percent by weight volatile content and a flow of about 4–6 percent. When melamine resin-impregnated sheets are used, about 60–65 percent by "dry" weight of the sheets are attributable to the melamine resin which has a volatile content of about 8–10 percent by weight.

During the molding process, the thermoplastic urethane elastomer sheet melts and flows into the adjacent sheet in the stack. By "unitary" it is meant herein that during the cure, the various layers become fused to one another so that after cure, the laminated product cannot readily be separated into its constituent layers.

In some applications a smooth non-skid surface is desired, as where the non-skid surface will be in contact with objects under dry conditions. In other applications an embossed surface is preferred, as where the surface will be in contact with objects under wet conditions.

In a preferred embodiment the thermoplastic polyurethane film sheet is about 0.001 to about 0.005 inches thick and a second sheet of a thermoplastic polyurethane film of substantially the same size as the first sheet and having a thickness of about 0.002 to about 0.006 inches is bonded to the non-skid surface of the laminate.

Urethane elastomer films can either be polyether polyurethane or polyester polyurethane, both of which are generally well-known in the art. Polyether polyurethanes are preferred. Useful polyurethane films are available commercially from, for example, Deerfield Urethane, Inc., of South Deerfield, MA., which sells a numer of suitable films of several thicknesses under the trade name DUREFLEX. Further, the degree of slip, tack, "hand", gloss, and opacity of the polyurethane elastomer film can be modified by the supplier to suit a particular application.

A most preferred urethane elastomer film is the polyester polyurethane DUREFLEX PT 6320F. Film PT 6320F has a somewhat greater lubricant content than does the polyester polyurethane film sold under the designation DUREFLEX PT 6300, which is also suitable. However, the additional lubricant is advantageous in that it improves the ease of separating the film sheets. The other processing characteristics of the films are substantially the same.

Polyether polyurethanes sold under the designation DUREFLEX PT 9100 and PT 9300 have similar characteristics to those of Film PT 6300. In particular, their processing range and hardness are very similar as reported in a Deerfield Urethane, Inc. brochure. Further, the reported elongation values, tear strength values, yield and taber abrasion values are also similar.

Polyester polyurethanes, such as DUREFLEX PS 3300, PS 3400, and PS 8600 also have similar characteristics and are useful in the laminates of this invention.

Specifically, physical properties of the aforementioned DUREFLEX polyurethanes (PT 6320F, PT 6300, PT 9100, and PT 9300) include a processing temperature range of 340°–460° F., a hardness range (Shore A Durometer values) of 80–95, an elongation value range of 400 to 550 percent, a tear strength value range of 300–500 lbs./in., a yield value range of 144 to 170 sq.ft./lb./mil and a taber abrasion value range of 8 to 20. DUREFLEX PT 6300 and also PT 6320F have a processing temperature range of 340°–360° F., a hardness value of 80, a 550 percent elongation value, a 420 lbs./in. tear strength; a yield of 170 sq.ft./lb./mil and a taber abrasion value of 12.

The assembly can be varied to suit the application of the laminate. For example, when a countertop or like surface is desired, the non-skid surface can cover substantially all of the top surface of the laminate. The bottom surface need not be decorated, nor include a non-skid thermoplastic surface. Therefore, the assembly can include a sheet of thermoplastic material that covers substantially all of the top surface of the assembly and need not include a second decorative sheet.

In applications such as a serving tray, upturned edges of the tray can be left with a smooth surface not covered by the non-skid layer and the bottom of the tray preferably has a decorated surface. Therefore, first and second decorated sheets are placed into the stack adjacent to and on either side of the core. The thermoplastic sheet preferably has about one-half inch smaller dimensions than the core and decorative sheet to permit formation of a thermoplastic non-skid layer-free border around the tray.

The decorative sheets are preferably a solid color, wood grain, or the like. Although the non-skid surface is preferably transparent, the thickness of the non-skid surface can distort the design of the decorative sheet somewhat.

In personalized applications, an inked design or the like can be placed directly on the non-skid layer after it is cured. A second urethane layer is thereafter fused to the laminate and seals in the design.

Alternatively, the inked design can be placed on the second thermoplastic sheet before fusing to the laminate. The printed surface is placed adjacent to the non-skid surface of the laminate prior to a heating step to fuse the sheet to the non-skid surface of the laminate, so that the printed design is sealed between the sheets after fusing.

Printed indicia can also be placed on the non-skid surface of the finished tray. Indicia applied in this manner are not protected by a thermoplastic resin layer and wear more quickly than indicia sealed between urethane layers.

A sheet of paper, photograph or like design can similarly be sealed between the layers. This is less preferred than printing directly on the thermoplastic layer because the edges of the paper remain discernible.

A most preferred embodiment of the invention contemplates a decorated, heat and pressured cured, unitary non-skid laminated tray. Before cure, the tray comprises in the recited arrangement at least one sheet of a thermoplastic urethane elastomer film having a thickness of about 0.001 to about 0.010 inches, a decorative sheet impregnated with a phenolic thermosetting resin, about 7 to about 17 kraft paper core sheets impregnated with a thermosetting phenolic resin, and a decorative sheet impregnated with a phenolic thermosetting resin.

The urethane sheet can be smaller than the surface of the core sheets. In this case, the resultant tray has a non-skid surface that does not extend to the edges of the tray. The non-skid surface can also be embossed.

A method of producing a non-skid laminated sheet of this invention is described in a pending, commonly owned application filed on even date. That method is incorporated herein by reference.

The foregoing is intended as illustrative of the present invention but is not limiting. Numerous variations and modifications can be effected without departing from the spirit and scope of the novel concepts of the invention.

I claim:

1. In a decorated laminated tray comprising a unitary, heat and pressure cured, fused together layered structure having a non-skid surface, the improvement comprising before said cure and in the arrangement recited:
   (a) at least one sheet of a thermoplastic urethane elastomer film having a thickness of about 0.001 to about 0.010 inches;
   (b) a decorative sheet impregnated with a curable thermosetting resin adjacent to said film;
   (c) about 7 to about 17 kraft paper core sheets impregnated with a curable thermosetting resin being adjacent both to said core sheets and to said urethane elastomer film,
   said non-skid surface being provided at the surface of said laminated tray, said thermosetting resins comprising one of a phenolic or a melamine resin.

2. The tray in accordance with claim 1 wherein said urethane sheet is smaller than said core sheets.

3. The tray in accordance with claim 1 wherein said urethane sheet on said tray is embossed.

* * * * *